May 10, 1949. F. S. LOW 2,470,073
ELECTROLYTIC CELL AND METHOD OF OPERATING SAME
Filed Aug. 16, 1944 3 Sheets-Sheet 1
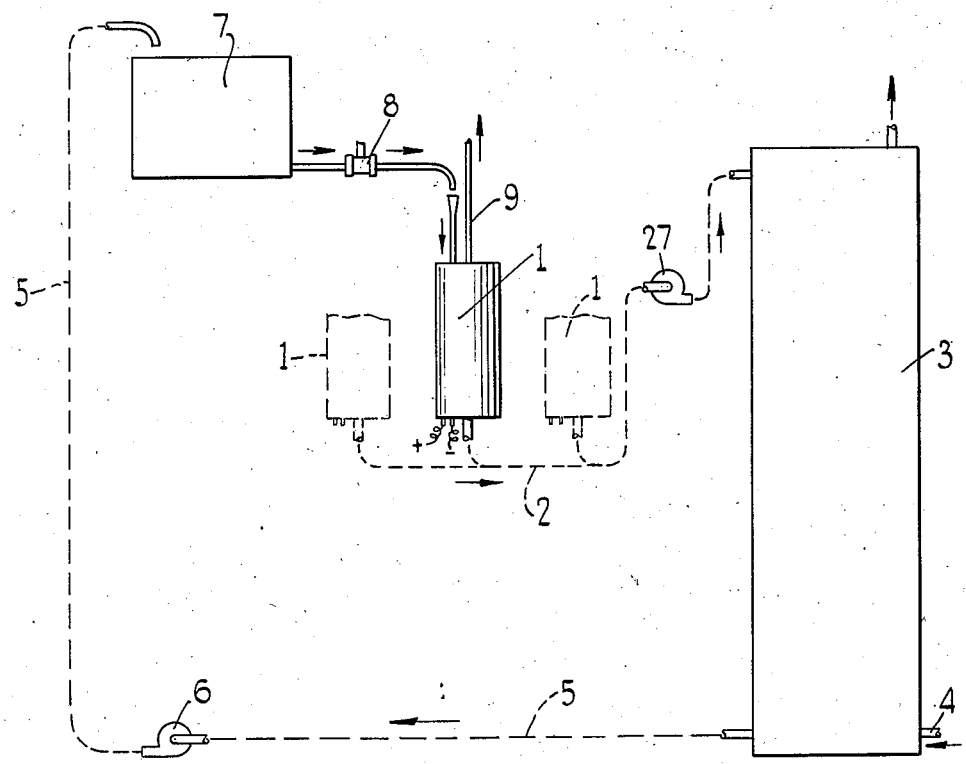
Fig. I.
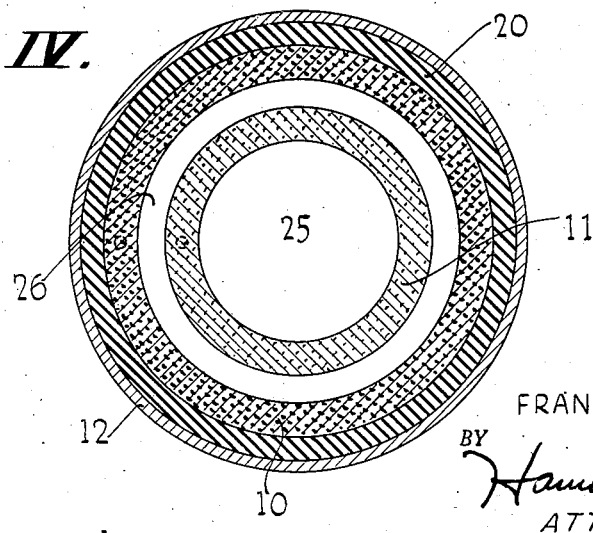
Fig. IV.
INVENTOR.
FRANK S. LOW
BY Hammond & Littell
ATTORNEYS May 10, 1949.  F. S. LOW  2,470,073
ELECTROLYTIC CELL AND METHOD OF OPERATING SAME
Filed Aug. 16, 1944  3 Sheets-Sheet 2
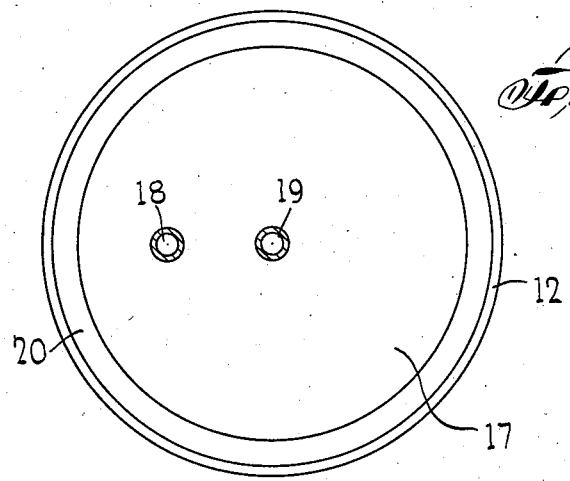
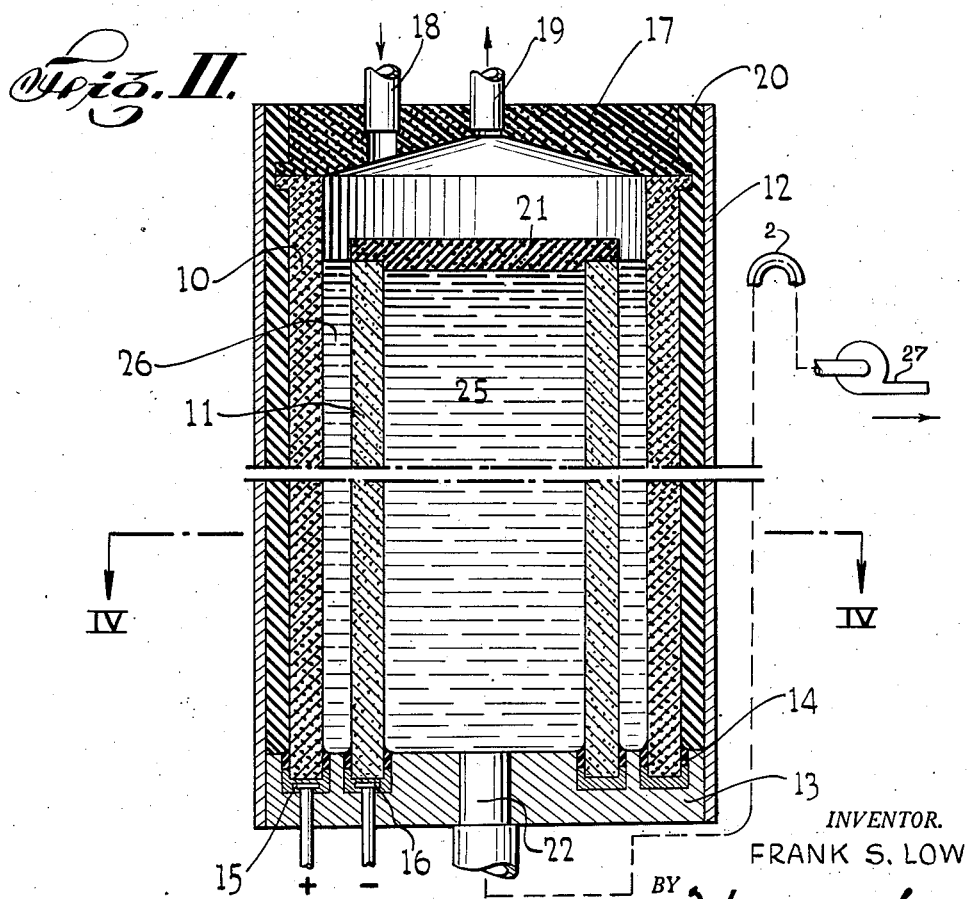
INVENTOR.
FRANK S. LOW
BY Hammond & Littell
ATTORNEYS

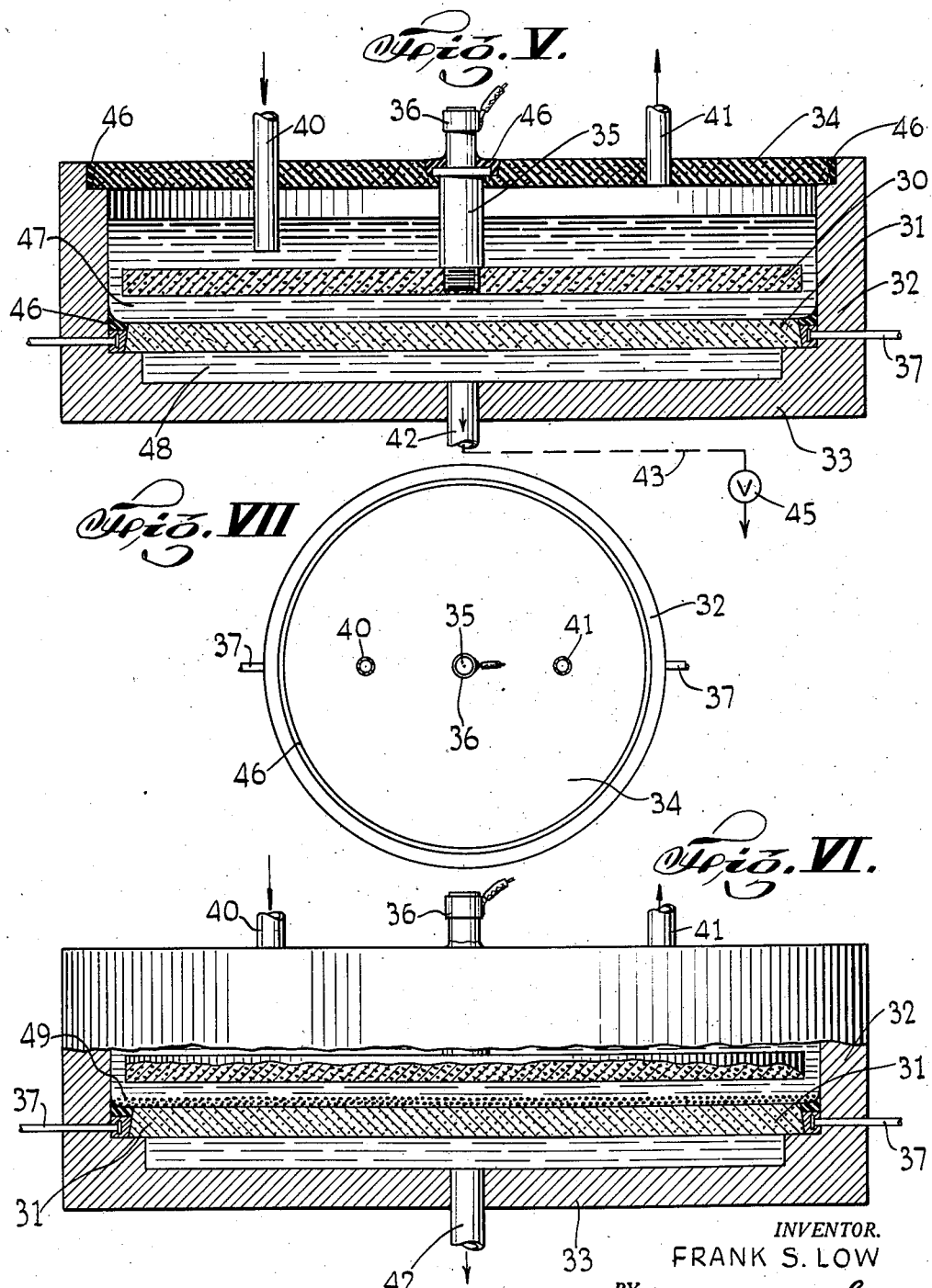

Patented May 10, 1949

2,470,073

UNITED STATES PATENT OFFICE 2,470,073

ELECTROLYTIC CELL AND METHOD OF OPERATING SAME

Frank S. Low, Bronxville, N. Y., assignor to Food Machinery and Chemical Corporation, New York, N. Y., a corporation of Delaware Application August 16, 1944, Serial No. 549,664

3 Claims. (Cl. 204—266)

This invention relates to electrolytic cells suitable for various electrolytic processes and in particular for the continuous production of chlorine by the electrolytic reduction of metal polyhalides as cupric and ferric chlorides to cuprous and ferrous chlorides.

Cells for the electrolytic reduction of metal salts of higher valency state have been proposed heretofore for the purpose of producing salts of a lower valency state but they have never been proposed for recovery of chlorine from by-product or waste hydrogen chloride. Numerous tests with cells of known construction indicate that even if they had been proposed for this purpose, they would not be successful due to low efficiency.

A primary object of the present invention is to provide electrolytic cells for the recovery of chlorine by the reduction of metal polychlorides capable of operation under conditions of very high current efficiency. A broader object is to provide cells having utility in electrolytic processes in general where the control of operating conditions within narrow limits is desirable or necessary for obtaining optimum results.

By-product hydrochloric acid is obtained in a large number of industrial processes such as in substitution chlorination of organic compounds, manufacture of salt cake from sodium chloride by reaction with sulphuric acid or with $SO_2$ and oxygen preparation of synthetic resins. The economic feasibility of many of these processes depends upon finding a satisfactory process for recovering the chlorine contained in the by-product hydrogen chloride. In the past, attempts have been made to solve this problem by the direct electrolysis of hydrochloric acid but this process proved to be unsatisfactory because the costs of operation for power and maintenance were excessive.

Other attempts have been made to recover chlorine from hydrogen chloride by the so-called Deacon process. In this process, hydrogen chloride with sufficient oxygen or air is passed over an oxidation catalyst resulting in the formation of chlorine and water. The chlorine obtained in this process is impure, being admixed with unreacted hydrogen chloride, oxygen or air, and contains considerable water which makes the gases difficult to handle. For these reasons, costs of the process are prohibitive, and it is actually cheaper to discard the hydrogen chloride rather than attempt the recovery of chlorine therefrom. Improvements on the process which have been suggested, such as use of different catalysts, the use of pure oxygen and the like, have not proved to be entirely satisfactory.

It is, accordingly, an object of my invention to provide an electrolytic cell suitable for the recovery of chlorine by electrolytic reduction of a metallic chloride which may thereafter be reoxidized with hydrogen chloride and oxygen.

Another object of my invention is to provide an electrolytic cell for electrolytic reduction of oxidizable metallic chlorides to produce chlorine and reduced metal chlorides in which chemical attack on structural members of the cells is substantially eliminated, thereby securing long life in cell parts and elimination of replacement of members.

Still another object is to provide an electrolytic cell capable of electrolyzing metallic chlorides in aqueous solution to produce chlorine and reduced metalic chloride at high current densities whereby maximum production of chlorine is secured at minimum operating costs.

Still another object of my invention is to provide an electrolytic cell of convenient design in which gas blanketing is substantially minimized and evolution of hydrogen is eliminated.

Still another object is provision of an electrolytic cell for production of chlorine by electrolysis of an aqueous solution of a metallic chloride which is flexible in operation and which may be shut down without deleteriously affecting subsequent performance of the cell.

Another object is provision of an electrolytic cell which may be operated without a diaphragm to electrolyze aqueous solutions of reducible metallic chlorides, although the use of a diaphragm in the cell herein disclosed is within the scope of my invention.

These objects and others are procured in optimum degree by the employment of certain selected materials for the electrode and cell construction, by selecting certain shapes of electrodes, by mounting or arranging the electrodes in a certain manner in the cell casing of proper construction and shape and by operating the cell in accordance with a specific procedure. Novelty is considered to reside not only in the whole combination of materials, construction, arrangement and operation but also in various subcombinations of these factors from which highly desirable results can be obtained in electrolytic operation.

The overall process is claimed in copending application, Serial No. 529,926, filed April 7, 1944.

The invention can be readily understood from the accompanying drawings wherein several embodiments are illustrated.

Figure I is a schematic diagram of a cyclic chlorine recovery process in which my cells may be advantageously used.

Figure II is a vertical section through one type of electrolytic cell of which Figure III is a top plan view and Figure IV is a horizontal section.

Figures V and VI are vertical sections through alternative cells differing fundamentally from each other only in the inclusion of a diaphragm, and Figure VII is a top plan view thereof.

With reference to Figure I, there is illustrated a diagrammatic arrangement of apparatus for the recovery of chlorine containing one or more electrolytic cells 1 of the present invention in which a metal chloride such as cupric or ferric chloride is electrolyzed. During operation of the cell or cells, partially reduced electrolyte containing cuprous or ferrous chloride is withdrawn through a pipeline 2 to an oxidizing unit 3 in which it is oxidized with hydrogen chloride and oxygen introduced through the inlet pipe 4. The metal chloride solution oxidized in this tower 3 is conducted from the tower through a pipeine 5, the unabsorbed gases being vented off from the top of the tower. The solution in the pipeline 5 is forced by the pump 6 to a storage unit 7 from which it is fed at a predetermined rate to the cell 1 through a pipeline preferably containing a suitable heater unit 8 capable of controlling the temperature of the electrolytic solution being fed to the cell. Ordinarily, it is desirable that the water formed in the electrolyte during the reoxidation step be removed before it is introduced into the cell and any suitable heating means (not shown) for this purpose may be employed. The chlorine produced is withdrawn from the cell 1 through a pipeline 9.

In Figure II, there is illustrated a cell of preferred construction under the present invention having a vertically disposed annular or cylindrical anode 10 constructed suitably of a standard grade of relatively impervious graphite, and a vertical annular cylindrical uniformly porous graphite cathode 11 of uniform thickness having a predetermined permeability hereinafter described. These concentric plate electrodes are mounted within the cell wall 12 having a bottom 13 in which the electrodes are sealed by means of a high melting pitch 14 or other suitable luting material and in contact with one or more points of lead embedded conductors 15 and 16 in turn connected to a source of power (not shown). The cell 1 is also provided with an impervious top or cover 17 as of hard rubber having therein an inlet 18 for the introduction of electrolyte and an outlet 19 for the withdrawal of chlorine or other gas. The anode 10 is embedded in and separated from the cell wall 12 by means of a high melting pitch 20 or other equivalent material. The cylindrical porous cathode 11 is capped or closed by a substantially nonporous cover 21 suitably composed of hard rubber. The bottom 13 of the cell contains an outlet 22 at its center and is connected to pipeline 2 as illustrated in Figure 5. Gooseneck shape connection 2 is adapted to maintain the level of the catholyte within the space 25 inside the cylindrical cathode hereinafter referred to as the catholyte chamber at the top of the porous or active area of the cathode 11. The space 26 between the anode 10 and the cathode 11 is hereinafter referred to as the electrolyte chamber. A pump 27 in the line 2 may be relied upon to force the reduced electrolyte to the top of the tower 3 shown in Figure I.

The upper portion of the anode 10 above the normal operating level of the electrolyte is suitably impregnated as with halowax, a high melting point wax, to prevent chlorine seepage and other loss.

In the operation of the electrolytic cell of Figures II, III, and IV, the metal chloride to be reduced or other electrolyte to be treated is introduced through the inlet pipe 18 at a rate which maintains the electrolyte in the electrolyte chamber 26 at a point above or substantially at the top of the cathode or sufficiently high to cover the whole porous area of the cathode. The high valence metal chloride is electrolyzed in the chamber 26, gives up a portion of its chlorine and in its reduced form passes through the porous cathode into the catholyte chamber 25. The gooseneck conduit 2 maintains the catholyte substantially at the top of the cathode or its active porous area thereby maintaining the salt solution at substantially the same height on both sides and substantially completely submerging the porous cathode. The chlorine released, as gas, rises to the top from whence it flows out of the cell through the outlet 19 into the pipeline 9.

High current efficiency and high chlorine recovery in the above-described cell operated in the above manner are obtained through the following combined effects of the structure and arrangement of parts.

The rate of flow of electrolyte through the cell is correlated with the porosity of the cathode 11 such that the electrolyte covers the porous area of the cathode at all times and hence prevents seepage of chlorine into the cathode chamber and its loss through oxidation of the reduced chloride. By maintaining the catholyte on the inside of the cathode in chamber 25 at substantially the same level as on the outside or in the chamber 26, equalization of the pressure between the two chambers is accomplished, and uniform flow of catholyte through the cathode of uniform thickness is thereby obtained. Since the electrodes are concentric, most if not all of the active surface of the porous cathode is equidistant from the opposing surface of the anode.

The relative position of the cathode to the anode in this Figure II may be the opposite from that illustrated, for the anode may be mounted within the cathode, in which case, the electrolyte would flow in an outwardly direction through the surrounding cathode rather than in an inwardly direction.

The cathode is preferably made of graphite, any good grade of porous conducting carbon being operable. The anode may be constructed of any material resistant to the electrolyte selected, and ordinary electrode grade graphite is generally satisfactory. For any particular electrolytic reaction, a cathode having the desired permeability may be selected.

With reference to Figures V, VI, and VII, electrolytic cells of alternative embodiments are illustrated, which cells have a circular plate anode 30 preferably of nonporous construction and a porous cathode 31. These electrodes are mounted in a container having a wall 32, a bottom 33, and a top 34. The anode 30 is suitably supported in the top 34 by means of a graphite rod 35 which is threaded or otherwise connected in the top of the anode. Electrical connection to the anode is made through a metal band 36 and is made to the cathode through one or more lead embedded lead-ins 37. The top of the cell is provided with an inlet 40 for the introduction of electrolyte and an outlet 41 for the withdrawal of chlorine or other gas. The bottom of the cell is provided with an outlet 42 for the withdrawal of spent electrolyte, connected to a pipeline 43 having therein a level regulating valve 45 for maintaining the cathode and anode submerged. The cathode 31, the top 34, and the graphite rod 35 are sealed in by being embedded in high melting pitch 46 or other suitable material. The cathode 31 rests upon a lip or ledge around the wall 32 of the cell and in such position provides an anolyte chamber 47 above the cathode and a catholyte chamber 48 below it.

The embodiment of the invention illustrated in Figure VI contains a diaphragm 49 composed of a layer of sand resting upon the upper surface of the cathode 31. The size of the sand particles has an appreciable effect on the operating efficiency and should be selected for any particular operation so as to give the best operating results. A 30-40 mesh cut gives good results but other cuts may be employed including finenesses up to an 80-100 mesh cut. The sand diaphragm in the position indicated in Figure VI is very much preferred in processes involving the use of electrolytic solutions containing substantial quantities of hydrochloric acid. Acid leached asbestos and glass wool, however, may be used satisfactorily over short periods. Horizontal cells have certain disadvantages such as gas blanketing when employed in the usual processes to which the cell is particularly adapted, but they also have certain advantages in processes in which low current densities are desirable or required.

Although cathodes and anodes of only two shapes have been illustrated, other geometrical forms of open and closed plate construction may be employed, including for example, polygonal, elliptical, and conical electrodes, but for optimum results the cathode must be of such thickness and porosity and so arranged as to permit flow of electrolyte therethrough at a uniform rate over substantially its whole active porous surface. Also, the cathodes and anodes should be so arranged that substantially all or most of the submerged surface of the cathode opposing the anode is equidistantly spaced therefrom.

My cell may be operated with a wide variation in conditions, and since many of the variables are interdependent, a change in one variable effects a change in other. However, I have generally found that the cell may be operated satisfactorily within the scope of the range of variables noted hereinbelow.

An electrolyte which I have found satisfactory for the practice of my invention comprises cupric chloride in a concentration of about 15 per cent by weight (or a chemically equivalent amount of ferric chloride), about 20 per cent hydrogen chloride by weight, and the balance water. I have discovered that this electrolyte does not attack graphite at an appreciable rate. Further, I have found that the presence of hydrochloric acid during the electrolysis tends to keep the metallic chloride in solution so that difficulties such as precipitation of insoluble metallic chloride on the cathode or other cell parts are eliminated.

The concentration of metallic chloride in the electrolyte may be varied over wide limits. The upper limit for metallic chloride concentration is the solubility of the chloride in the electrolyte. It is desirable to keep the concentration of the metallic salt in the electrolyte high. At room temperature, the solubility limit for cupric chloride in a solution containing 20 per cent HCl is about 17 per cent by weight and for ferric chloride approximately a chemically equivalent concentration. At higher temperatures the solubility is higher. However, lower concentrations of metallic chloride may be used, but in that event it is necessary to circulate more electrolyte to the cell to secure a given output of chlorine. I find that at concentrations below 5 per cent cupric or ferric chloride, an excessive amount of electrolyte must be circulated and furthermore, oxidation of the effluent cuprous or ferrous chloride from the cell becomes more difficult. The optimum concentration of cupric chloride in the electrolyte is about 15 per cent.

The hydrochloric acid concentration of the electrolyte may also be varied over wide limits. In the lower concentrations, the resistance of the electrolyte is high, causing high power consumption. Also, at the lower concentrations, there is a tendency toward precipitation of reduced metallic chloride. About 5 per cent concentration of HCl in the electrolyte represents the practical lower limit since lowering the concentration below that amount causes the resistance of the electrolyte to rise rapidly. Practically considered, the upper limit of hydrogen chloride concentration is about 25 per cent since at higher concentrations HCl tends to be driven from the electroylte with the chlorine. This results in inefficient operation and impure chlorine.

An electrolyte of approximately 15 per cent by weight of cupric chloride and 20 per cent of hydrogen chloride has high chlorine carrying capacity and low corrosiveness with respect to graphite. A solution of this composition is less corrosive than a solution of hydrochloric acid alone. I have found no evidence of attack on graphite used for construction of my cell by this electrolyte composition over long periods of use which result is in contrast to the severe attack of hydrochloric acid alone on graphite. Furthermore, this solution is readily oxidized, making it suitable for cyclic operation in which the electrolyte is repeatedly electrolyzed and then reoxidized with HCl and oxygen. By virtue of the fact that additional hydrogen chloride may be readily added either before, during or after the oxidizing step to keep the hydrogen chloride at the desired concentration, the process has great flexibility. The high acidity keeps the metallic chloride in solution and eliminates cathode plugging difficulties or deposition of salts in the circulating lines. If the acid concentration in the electrolyte is not maintained sufficiently high to prevent the precipitation of insoluble compounds at the cathode, the voltage of the cell will slowly rise and the power consumption of the cell will become excessive. Accordingly, it is important in the operation of the process to maintain the hydorgen chloride concentration in the electrolyte at a high level, preferably within the range noted hereinabove.

The use of a porous graphite cathode may in many embodiments eliminate the necessity of a diaphragm, and this omission is in accordance with the preferred construction of the cells of the present invention. Where the use of a diaphragm shows an increase in cell efficiency, however it is preferable to use one. Where the diaphragm can be eliminated, the cell construction is simplified, and the voltage requirements of the cell are reduced.

The performance of the cell is greatly influenced by the permeability of the graphite or other carbon used as the cathode, but cathodes having a wide range of porosity may be used. I prefer ordinarily to use a material having a permeability of about 30 gallons of water per square foot per minute at 5 lbs./sq. in. pressure, but cathodes having as high a permeability as 175 gallons/sq. ft./min. at 5 lbs. per sq. in. pressure and as low as .3 gals./sq. ft./min. at 5 lbs. per sq. in. pressure may be used with satisfactory results provided suitable adjustments in operating conditions are made. All of the above permeabilities are based on the flow of water at 70° F. through graphite pieces 1" thick. Because of the porosity of the graphite used, the cathode is ordinarily run submerged, that is with the liquid level on the exit side of the cathode about as high as that on the inlet side, as indicated by the liquid levels shown in the chambers 25 and 26 in Figure II.

The thickness of the porous graphite cathode should be uniform and may be from about ¼" to about 1½", or even thicker. The thicker sections are desirable because they show increased strength. Also, the thicker sections have greater electrical conductivity with resulting decrease in power consumption.

The anode may be any resistant material that conducts electricity and should be impervious or should be backed up with an impervious material, in the type of cell illustrated in Figures II and III. I find that ordinary electrode grade graphite is satisfactory.

I have found that for any given set of conditions there is an optimum flow rate for minimum power consumption in my cell. However, the cell may be operated over a very wide range of flow rates above the minimum flow rate required to introduce metallic chloride ions into the cell as fast as they are reduced at the cathode. The minimum flow rate will depend upon the concentration of metallic chloride and the current density at which the cell is operated. For example, the optimum flow rate at a current density of 168 amperes/sq. ft. with a feed containing about 188 grams/liter of cupric chloride is approximately 2.7 gal./hr./sq. ft. of cathode. At higher current densities, larger amounts of electrolyte would be required and conversely, at lower current densities, smaller flow rates are sufficient.

The flow rate should be such as to sweep the reduced metal chlorides through the cathode substantially as rapidly as they are formed and thus quickly separate the reduced electrolyte from the unreduced electrolyte flowing into the cell. If the flow rate through the cathode is such as to permit substantial amounts of partially reduced metal chloride, for example, to remain in the portion of the cell between the anode and the cathode, this appears to react with the dissolved chlorine in the electrolyte and reduces the current efficiency.

It is possible to operate the cells described at higher current densities than is ordinarily thought feasible for the electrolytic production of chlorine. For example, in cells (other than mercury cells) which produce chlorine by electrolysis of sodium chloride solutions, current densities above 85 amperes/sq. ft. are not deemed practical or desirable whereas, in my improved cell, I may use current densities twice as high. For instance, I have operated certain cells at a current density of 168 amperes/sq. ft. at high efficiency, and in some cases have even carried the current density up to 252 amperes/sq. ft., even to 500 amperes/sq. ft. At the higher current densities there is a corresponding increase in voltage and above about 500 amperes/sq. ft. this increase in voltage results in excessively high power consumption per pound of chlorine produced. I prefer, therefore, to keep the current density below that figure. Another important discovery made in connection with this cell is that the current density at the cathode is less critical than at the anode and I take advantage of this fact in my improved cell construction by making the porous graphite cathode the inner cylinder which, having a smaller area, gives a higher current density for any given load, and I am able to do this with a minimum loss in power efficiency.

In the direct electrolysis of hydrochloric acid, ordinarily a voltage of 2.1 to 2.2 volts is required, but with my process I may produce chlorine by electrolysis of cupric chloride or ferric chloride at voltages as low as .72 volts. Because of this low voltage, I am able to produce chlorine from hydrochloric acid at lower power consumption than has been thought possible heretofore. The lower voltages are obtained at lower current densities; for example, the following table shows the effect of increased current density on voltage:

| Amperes Per Square Foot | Voltage |
|---|---|
| 42 | 0.72 |
| 84 | 0.89 |
| 168 | 1.24 |
| 252 | 1.69 |
| 500 | 2.69 |

Ordinarily, I prefer to operate the cell at about 168 amperes per sq. ft. of cathode area because at this current density I get maximum reduction of chlorine at minimum cost. However, for installations where the unit cost of power is high, it may be preferable to work at the lower current densities in order to get the advantage of lower power consumption. This flexibility in power consumption of my cell is an advantage, since it makes the cell suitable for a wide range of applications. Likewise, where power costs are low, it is advantageous to run the cell at high current densities to get a greater output of chlorine for a given unit of capital investment. This flexibility in operation is not obtained either in the direct electrolysis of hydrochloric acid or in the production of chlorine by electrolysis of sodium chloride, or in any other process with which I am familiar. The reason for this flexibility in operation is that the electrolyte used in the cells of the present invention has a very high conductivity and the absence of hydrogen evolution during electrolysis minimizes gas blanketing and resulting polarization of the cathode, thus permitting the use of high current densities. The presence of any reduced metallic chloride in the solution fed to the electrolytic cells results in loss of current efficiency since the first chlorine generated is absorbed in oxidizing the reduced metallic ions. Therefore, it is important that the electrolyte to be fed to the cells should be completely oxidized.

The oxidizing unit 3 may be either a tower having therein a suitable acid resistant packing over which the reduced electrolyte is passed from the upper portion of the tower while oxygen and hydrogen chloride are passed counter-current to the flow of electrolyte from the bottom; alternatively, the oxygen and hydrogen chloride may be passed concurrently with the flow of electrolyte and withdrawn from the bottom of the oxidizing unit; or a liquid column of electrolyte into which a mixture of hydrogen chloride and oxygen is finely dispersed; or a chamber in which the electrolyte is sprayed into contact with the hydrogen chloride and oxygen may be used.

In the oxidizing tower the oxygen or air and the hydrochloric acid or anhydrous HCl may be introduced simultaneously or additional hydrochloric acid may be introduced into the electrolyte either before it enters the tower or after leaving the tower, and only oxygen or air blown into the tower.

I find that I can oxidize cuprous chloride or ferrous chloride in the aqueous solution in the oxidizing unit 3 to the extent of 99 per cent or higher in either a packed column or a liquid column of the material through which diffused oxygen admixed with HCl is blown. In the packed column the oxygen may flow either countercurrent or concurrent to the solution. If desired, HCl may be introduced into the electrolyte either before, during or after its passage through the tower 3. The air or oxygen, however, is introduced in the tower.

In order to reduce capital costs, I find it desirable to use a single large oxidizing tower or unit in conjunction with a multiple cell installation to combine the electrolytic solutions from the series of cells, and to pass the mixture to the oxidizing unit and to recirculate the oxidized electrolyte to the cells for further electrolysis. Such operation is efficient and economical.

While I have referred to oxygen herein as the oxidizing gas, any gas containing oxygen, such as air, may be used. Air is ordinarily preferred because of ready availability and low cost. The term "oxygen" as used herein shall refer to pure oxygen, air or any suitable gaseous mixture containing oxygen.

During the oxidation, water is formed which tends to dilute the electrolyte and if the composition of the electrolytic solution is to be kept constant, it is necessary to provide for removal of this water.

I prefer to use either copper chloride or iron chloride or a mixture of these chlorides as the electrolyte. By selection from these two metallic chlorides it is possible to secure lower power consumption per pound of chlorine, to obtain greater chlorine purity, and to operate under less critical flow rate control and with greater ease of oxidation than when other commercially available metallic chlorides are employed. My process is not, however, restricted to the use of these two chlorides, but I may use any metallic chloride having two valence states, and which is reducible from the higher valence state to the lower valence state by electrolysis with evolution of chlorine, and which may be reoxidized from a lower valence state to the higher valence state with oxygen in the presence of hydrogen chloride.

I have found generally that operation with copper chloride in the cells of the invention is preferable to operation with iron chloride. Chromium chloride may also be used, although it does not give as satisfactory results as the aforementioned chlorides.

Operating in accordance with the procedures set forth above, I have found it possible to circulate the electrolyte repeatedly for months without substantial loss in efficiency. There appears to be no deterioration of cell performance due to recirculation of the electrolyte. In some cases, it may be desirable to purify the hydrogen chloride used in the oxidizing unit or to purify the electrolytic solution if impurities are introduced by the hydrogen chloride as may happen from HCl derived from the manufacture of salt cake or from other operations wherein impurities are found in the HCl. It is also desirable to filter the electrolyte during each cycle to remove any solids which might plug the cathode.

In one installation of my process, I operated a 750 ampere cell of the general structure herein described containing therein a cylindrical porous graphite cathode having a water permeability of 30 gallons/sq. ft./min. at 5 lbs./sq. in. pressure and at 1.35 volts. The electrolytic solution fed to the cell contained about 15 per cent by weight of cupric chloride and 20 per cent by weight of HCl. It was fed to the cell at a flow rate of 2.7 gal./hr./sq. ft. of cathode area, and at a temperature of 80° C. This cell was operated without a diaphragm and the cathode was totally submerged. The cell was operated at a cathode current density of 168 amperes/sq. ft. Due to the larger anode area, the current density at the anode was about 100 amperes/sq. ft. The current efficiency in this operation was high, being above 85 per cent, and the cell produced chlorine of over 99.0 per cent purity. The effluent reduced electrolytic solution from the cell contained about 10 per cent cupric chloride by weight, 4 per cent cuprous chloride, and 20 per cent HCl, by weight. The electrolyte was reoxidized in an oxidizing unit with air and HCl using about 25 cu. ft. of free air per gallon of electrolytic solution, and was then recirculated to the cell. The cell was operated for a long period of time under these conditions without change in these performance characteristics.

It should be understood that the present invention is not limited to the specific arrangement of parts, to the materials described, or the details of construction recited herein, for it extends to all equivalents which will occur to those skilled in the art upon consideration of the broad concepts of the invention as defined in the claims appended hereto.

I claim:

1. In an electrolytic cell, a vertical annular impervious anode forming one wall of an electrolyte chamber and extending to the bottom of said chamber, a vertical annular cathode having an annular active porous area extending to the bottom of said chamber and with all of the active surface thereof at a uniform distance from the nearest active surface of the anode and axially substantially coextensive therewith so as to form an electrolyte chamber only between said active surface of the cathode and anode, a catholyte chamber on the other side of said cathode opposite said electrolyte chamber, the said electrolyte and catholyte chambers being communicably connected only through the pores of said cathode, a non-porous cover member extending into said catholyte chamber and sealing the top thereof, an inlet connected to said electrolyte chamber for introducing electrolyte into said electrolyte chamber, a discharge outlet connected to said catholyte chamber for withdrawing catholyte therefrom, said catholyte passing through the pores of said cathode and through said discharge outlet, an outlet conduit connected to the top of said electrolyte chamber through which anodic gases can be withdrawn, and a liquid level regulator connected to the cathode discharge outlet maintaining the level of the electrolyte in the electrolyte chamber above the level of the catholyte in the catholyte chamber.

2. In an electrolytic cell, a vertical annular impervious anode forming one wall of an electrolyte chamber and extending to the bottom of said chamber, a vertical annular cathode having an annular active porous area extending to the bottom of said chamber, said cathode being mounted in spaced relation to said anode with all of the active surface thereof at a uniform distance from the nearest active surface of the anode and axially substantially coextensive therewith so as to form an electrolyte chamber between said cathode and anode, a catholyte chamber on the side of said cathode opposite said electrolyte chamber, the said electrolyte and catholyte chambers being communicably connected only through the pores of said cathode, a cover member sealing the top of said catholyte chamber, an inlet connected to said electrolyte chamber for introducing electrolyte into said electrolyte chamber, a discharge outlet connected to said catholyte chamber for withdrawing catholyte therefrom, said catholyte passing through the pores of said cathode and through said discharge outlet, an outlet conduit connected to the top of said electrolyte chamber through which anodic gases can be withdrawn, and a liquid level regulator connected to the cathode discharge outlet maintaining the level of the electrolyte in the electrolyte chamber above the level of the catholyte in the catholyte chamber and the catholyte chamber filled with catholyte.

3. In an electrolytic cell, an annular impervious anode forming one wall of a vertical annular electrolyte chamber and extending to the bottom of said chamber, a vertical annular cathode inside said annular anode and extending to the bottom of said chamber and having an annular active porous area, with all of the active surface thereof at a uniform distance from the nearest active surface of the anode and substantially coextensive therewith so as to form an electrolyte chamber only between said cathode and anode, a catholyte chamber on the side of said cathode opposite said electrolyte chamber, the said electrolyte and catholyte chambers being communicably connected only through the pores of said cathode, a cover member sealing the top of said catholyte chamber, an inlet connected to said electrolyte chamber for introducing electrolyte into said electrolyte chamber, a discharge outlet connected to said catholyte chamber for withdrawing catholyte therefrom, said catholyte passing through the pores of said cathode and through said discharge outlet, an outlet conduit connected to the top of said electrolyte chamber through which anodic gases can be withdrawn, a liquid level regulator connected to the cathode discharge outlet maintaining the level of the electrolyte in the electrolyte chamber above the level of the catholyte in the catholyte chamber and the top of the porous area of said cathode in said cell, and the catholyte completely filling said catholyte chamber.

FRANK S. LOW.

REFERENCES CITED

The following references are of record in the file of this patent:

UNITED STATES PATENTS

| Number | Name | Date |
| --- | --- | --- |
| 586,236 | Hulin | July 13, 1897 |
| 883,140 | Kugelgen | Mar. 24, 1908 |
| 1,054,497 | Billiter | Feb. 25, 1913 |
| 1,246,099 | Hulin | Nov. 13, 1917 |
| 1,752,348 | Levy | Apr. 1, 1930 |
| 1,982,224 | Michel | Nov. 27, 1934 |
| 2,207,734 | Heise et al. | July 16, 1940 |
| 2,273,036 | Heise et al. | Feb. 17, 1942 |
| 2,390,591 | Janes | Dec. 11, 1945 |

OTHER REFERENCES

"Transactions of the American Electrochemical Society," vol. 75, pages 147, 153 and 154.

Certificate of Correction

Patent No. 2,470,073.  May 10, 1949.

FRANK S. LOW

It is hereby certified that errors appear in the printed specification of the above numbered patent requiring correction as follows:

Column 3, line 25, for "pipeine" read *pipeline*; line 67, for "Figure 5" read *Figure 1*; column 7, line 51, for "amonuts" read *amounts*; and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*